United States Patent
Ahn et al.

(10) Patent No.: US 9,098,162 B2
(45) Date of Patent: Aug. 4, 2015

(54) TOUCH PANEL INCLUDING GRAPHENE AND METHOD OF MANUFACTURING THE SAME

(75) Inventors: Jong-hyun Ahn, Suwon (KR); Byung-Hee Hong, Suwon (KR); Young-Bin Lee, Suwon (KR); Su-Kang Bae, Suwon (KR); Hyeong-Keun Kim, Suwon (KR)

(73) Assignees: SAMSUNG TECHWIN CO., LTD., Changwon (KR); RESEARCH & BUSINESS FOUNDATION, Suwon-si (KR)

( * ) Notice: Subject to any disclaimer, the term of this patent is extended or adjusted under 35 U.S.C. 154(b) by 286 days.

(21) Appl. No.: 13/576,795

(22) PCT Filed: Feb. 1, 2011

(86) PCT No.: PCT/KR2011/000695
§ 371 (c)(1),
(2), (4) Date: Aug. 2, 2012

(87) PCT Pub. No.: WO2011/086700
PCT Pub. Date: Aug. 11, 2011

(65) Prior Publication Data
US 2012/0319976 A1    Dec. 20, 2012

(30) Foreign Application Priority Data

Feb. 2, 2010 (KR) .................. 10-2010-0009739
Feb. 2, 2010 (KR) .................. 10-2010-0009740
Feb. 3, 2010 (KR) .................. 10-2010-0010138

(51) Int. Cl.
G06F 3/045    (2006.01)

(52) U.S. Cl.
CPC ...... *G06F 3/045* (2013.01); *G06F 2203/04103* (2013.01); *Y10T 156/10* (2015.01)

(58) Field of Classification Search
USPC ........ 345/173–178; 178/18.01–20.04; 349/12
See application file for complete search history.

(56) References Cited

U.S. PATENT DOCUMENTS

2002/0149572 A1\* 10/2002 Schulz et al. .................. 345/174
2005/0057555 A1\* 3/2005 Nakamura et al. ............ 345/211
(Continued)

FOREIGN PATENT DOCUMENTS

JP    2007-335248 A    12/2007
JP    2009-200177 A    9/2009

OTHER PUBLICATIONS

International Search Report (PCT/ISA/210) issued by the International Searching Authority in corresponding International Application No. PCT/KR2011/000695 on Oct. 31, 2011.
Written Opinion (PCT/ISA/237) of the International Searching Authority in corresponding International Application No. PCT/KR2011/000695 on Oct. 31, 2011.
(Continued)

*Primary Examiner* — Ryan A Lubit
(74) *Attorney, Agent, or Firm* — Sughrue Mion, PLLC (57) ABSTRACT

A touch panel comprising a first substrate; a second substrate disposed facing the first substrate; a first conductive layer disposed on at least one surface of the first substrate; a second conductive layer disposed on at least one surface of the second substrate; first electrodes electrically connected to the first conductive layer; and second electrodes electrically connected to the second conductive layer, wherein at least one of the first conductive layer and the second conductive layer comprises graphene.

8 Claims, 8 Drawing Sheets

(56) References Cited

U.S. PATENT DOCUMENTS

2008/0048996 A1* 2/2008 Hu et al. ............... 345/174
2009/0071533 A1   3/2009 Choi et al.
2010/0053101 A1* 3/2010 Nozawa et al. ........ 345/173
2011/0030772 A1* 2/2011 Veerasamy ............ 345/173

OTHER PUBLICATIONS

International Preliminary Report on Patentability (PCT/IPEA/409), issued by the International Searching Authority in corresponding International Application No. PCT/KR2011/000695 on Jan. 31, 2012.

* cited by examiner

TOUCH PANEL INCLUDING GRAPHENE AND METHOD OF MANUFACTURING THE SAME

CROSS-REFERENCE TO RELATED PATENT APPLICATION

This application claims priority from Korean Patent Application Nos. 10-2010-0009740 and 10-2010-0009739 filed on Feb. 2, 2010, and No. 10-2010-0010138 filed on Feb. 3, 2010, respectively, in the Korean Intellectual Property Office, the disclosures of which are incorporated herein in their entirety by reference.

BACKGROUND

1. Field

Apparatuses and method consistent with exemplary embodiments relate to a touch panel, and more particularly, to a touch panel including graphene.

2. Description of the Related Art

A touch panel is a device for inputting two-dimensional (2D) coordinate data by pressing a surface of a display panel with a hand or a pointing device, wherein the display panel is arranged in an electronic device including a mobile phone, a portable game player, a personal digital assistant (PDA), or the like.

In particular, the touch panel can be disposed over a screen of a display apparatus including a liquid crystal display (LCD), an organic light emitting diode (OLED) display, a plasma display panel (PDP), a cathode-ray tube (CRT), or the like.

A resistive touch panel, a type of touch panel device, has a structure in which a transparent upper substrate having a transparent conductive film formed thereon and a transparent lower substrate having a transparent conductive film formed thereon are separate from each other, wherein the transparent conductive films face each other. When a user presses the upper substrate with force, the transparent upper substrate bends down so that the transparent conductive films contact each other, and according to changes in a resistance and a voltage due to the press, coordinates of a pressed location is detected.

For a touch panel according to the related art, an indium tin oxide (ITO)-based material or a thiophene-based polymer material is used as a conductive film to form the touch panel, and in this regard, conductive films formed of various materials are being developed to improve characteristics of a touch panel.

SUMMARY

The present invention provides a touch panel including graphene and a method of manufacturing the touch panel.

According to an aspect of the present invention, there is provided a touch panel comprising a first substrate; a second substrate disposed facing the first substrate; a first conductive film disposed on at least one surface of the first substrate; a second conductive film disposed on at least one surface of the second substrate; first electrodes electrically connected to the first conductive film; and second electrodes electrically connected to the second conductive film, wherein at least one of the first conductive film and the second conductive film comprises graphene.

At least one of the first substrate and the second substrate may comprise flexible polymer.

At least one of the first electrodes and the second electrodes may comprise graphene.

A plurality of spacers may be arranged on at least one of the first conductive film and the second conductive film.

An intermediate member may be disposed between the first substrate and the second substrate.

The touch panel may further comprise a first conductive line electrically connected to each of the first electrodes; and a second conductive line electrically connected to each of the second electrodes.

A protective film may be disposed on at least one of the first conductive film and the second conductive film.

The protective film may comprise at least one of poly(3,4-ethylenedioxythiophene) (PEDOT), PEDOT/PSS, a urethane-curable resin, an organic silicate compound, a thiophene-based polymer, polypyrrole, polyaniline, a ferroelectric polymer, and a ferroelectric inorganic material.

According to another aspect of the present invention, there is provided a method of manufacturing a touch panel comprising a first substrate whereon a first conductive film is disposed, and a second substrate whereon a second conductive film facing the first conductive film is disposed, the method comprising: preparing the first substrate and the second substrate; forming the first conductive film and the second conductive film, wherein at least one of the first conductive film and the second conductive film is formed by transferring graphene; and bonding the first substrate and the second substrate.

At least one of the first substrate and the second substrate may comprise flexible polymer.

The transferring of the graphene may involve performing a transfer by using a tape.

The transferring of the graphene may involve performing a transfer by coating liquefied polymer.

The method may further comprise: forming first electrodes electrically connected to the first conductive film; and forming second electrodes electrically connected to the second conductive film.

At least one of the first electrodes and the second electrodes may be formed by performing a screen printing method using a paste comprising silver (Ag) or performing an ink-jet printing method using nano-ink.

At least one of the first electrodes and the second electrodes may be formed by patterning a metal catalyst layer that is used to grow the graphene.

At least one of the first electrodes and the second electrodes may be formed by patterning the graphene.

The patterning of the graphene may comprise: forming a pattern mask on the graphene; and selectively removing portions of the graphene.

The patterning of the graphene may comprise additionally transferring graphene to the graphene by using patterns corresponding to the at least one of the first electrodes and the second electrodes.

The method may further comprise, between the forming and the bonding, disposing a protective film on at least one of the first conductive film and the second conductive film.

The protective film may comprise at least one of poly(3,4-ethylenedioxythiophene) (PEDOT), PEDOT/PSS, a urethane-curable resin, an organic silicate compound, a thiophene-based polymer, polypyrrole, polyaniline, a ferroelectric polymer, and a ferroelectric inorganic material.

The method may further comprise, between the forming and the bonding, disposing a plurality of spacers on at least one of the first conductive film and the second conductive film.

The bonding may be performed by using an intermediate member.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

Hereinafter, exemplary embodiments will be described in detail with reference to the attached drawings. In the drawings, like reference numerals in the drawings denote like elements having the substantially same configuration. Also, for the purposes of promoting an understanding of the inventive concept, the thickness and the size of each component may be exaggerated.

Figure 1:
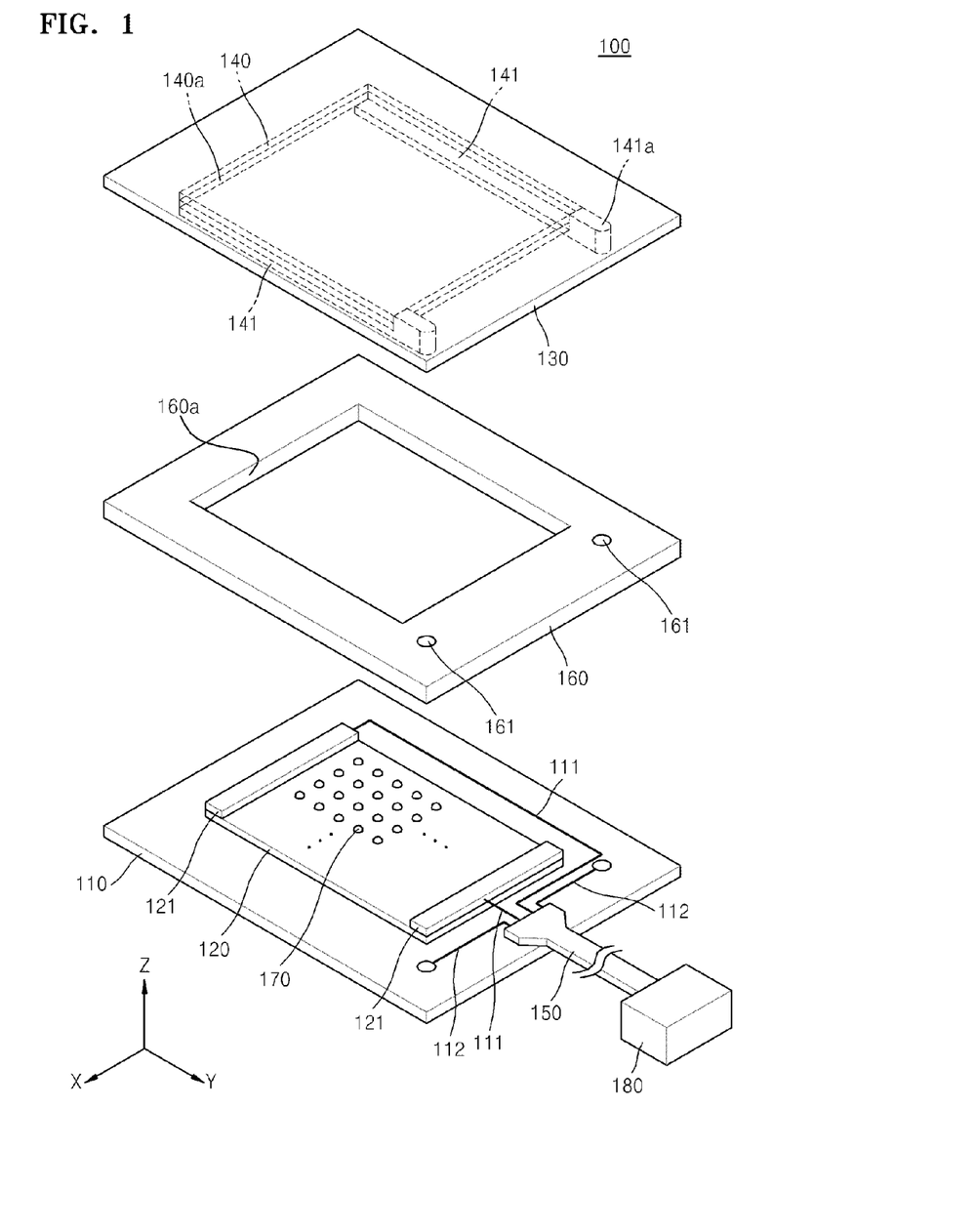
FIG. 1 is an exploded perspective view of a touch panel according to an exemplary embodiment.
Figure 2:
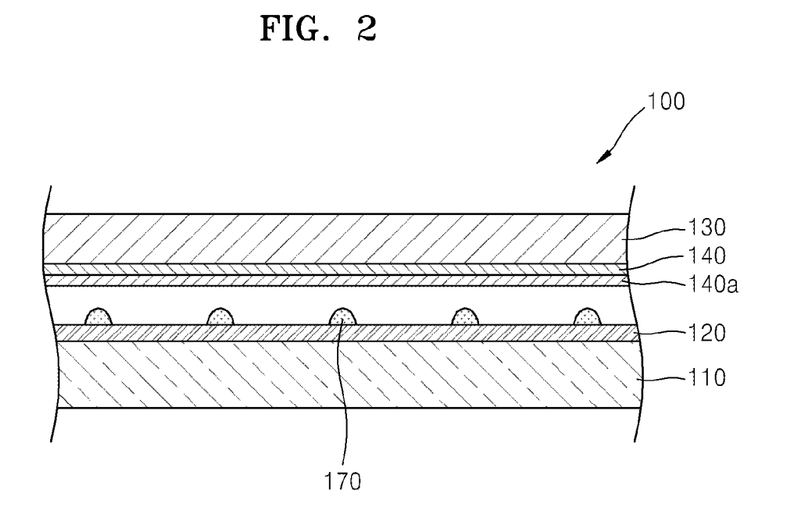
FIG. 2 is a cross-sectional view of a portion of the touch panel according to the exemplary embodiment.
Figure 3:
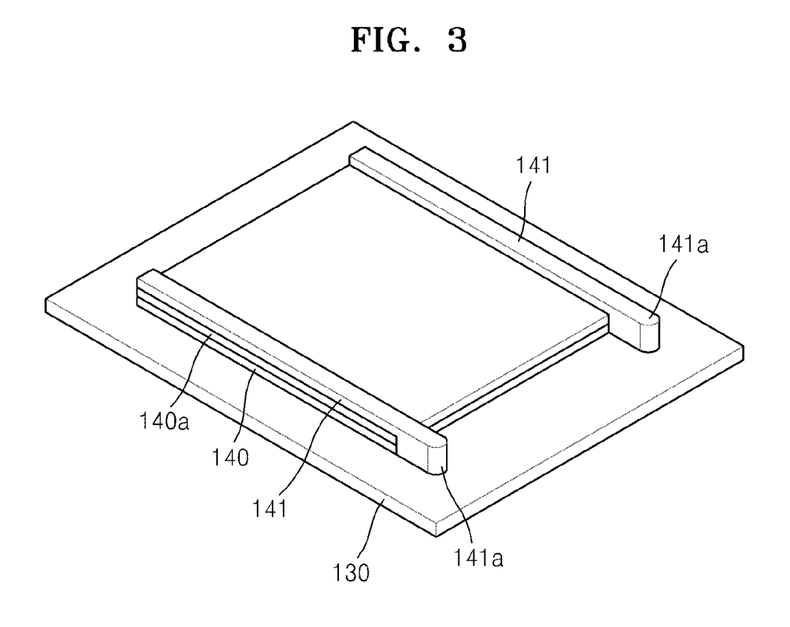
FIG. 3 is a perspective view of the touch panel in which a second conductive film is arranged on a second substrate, according to an exemplary embodiment.

FIG. 1 is an exploded perspective view of a touch panel 100 according to an exemplary embodiment. FIG. 2 is a cross-sectional view of a portion of the touch panel 100 according to an exemplary embodiment. FIG. 3 is a perspective view of the touch panel 100 in which a second conductive film 140 is arranged on a second substrate 130 according to an exemplary embodiment.

The touch panel 100 is a resistive-type touch panel that includes a first substrate 110, a first conductive film 120, the second substrate 130, the second conductive film 140, a connector 150, an intermediate member 160, and a plurality of spacers 170.

The first substrate 110 is formed of a light-transmitting glass material.

The first conductive film 120 is arranged on a top surface of the first substrate 110, and is formed of an indium tin oxide (ITO)-based material.

A pair of first electrodes 121 is disposed at X-axial side ends of the first conductive film 120.

The first electrodes 121 function to supply a voltage to the first conductive film 120 to detect a press location, and are formed to have a predetermined pattern shape by using a paste including a conductive material such as silver (Ag), gold (Au), or the like.

A first conductive line 111 for electrically connecting the first electrodes 121 and the connector 150, and a second conductive line 112 for being electrically connected to second electrodes 141 are formed on the upper surface of the first substrate 110.

The second substrate 130 is formed of a polymer material that transmits light and is flexible. For example, the second substrate 130 may be formed of polyethylene terephthalate (PET), polycarbonate, acryl, cycloolefin, or the like.

As illustrated in FIGS. 1 through 3, the second conductive film 140 is formed on a lower surface of the second substrate 130 by transferring graphene.

The second conductive film 140 is formed of a material including graphene. Graphene is a two-dimensional (2D) carbon allotrope that has been actively researched in recent years.

Graphene has very remarkable characteristics that are different from those of related-art materials. One of these characteristics is zero effective mass of electrons, that is, electrons flow in the graphene as if the electrons have zero mass, meaning that the electrons flow at the speed of light in vacuum. A known electron mobility of graphene maximally reaches 200,000 cm2/Vs. With respect to electrons and holes, graphene shows an abnormal half-integer quantum hall effect, and also shows a fractional quantum hall effect when graphene hangs in the air.

Also, an electrical characteristic of graphene may be changed according to a crystal directionality of graphene having a predetermined thickness, so that a user may realize the electrical characteristic in a desired direction, and may easily design a device accordingly. The electrical characteristic of graphene is compared to a carbon nanotube (CNT) of which metal and semiconducting electrical characteristics vary according to a chiral function and a diameter. In a case of the CNT, it is necessary to separate the CNT so as to use particular semiconductor and metal characteristics but it is very difficult to perform this separation process. Also, graphene is advantageous in an economic aspect, compared to the CNT that requires a refining process after composition. Thus, graphene may be effectively used in a carbon-based electric device or in an electromagnetic device.

Graphene is highly shock resistant and flexible, compared to an oxide transparent electrode formed of an ITO-based material. Also, graphene has high transparency and high electrical conductivity.

A protective film 140a is arranged on an entire surface of the second conductive film 140.

The protective film 140a functions to increase reliability of an operation of the touch panel 100 by protecting the second conductive film 140 formed of a graphene material. The protective film 140a is formed of poly(3,4-ethylenedioxythiophene) (PEDOT), which is a conductive material. The PEDOT has not only high transparency with respect to visible rays but also has high affinity to graphene since the PEDOT is an organic material.

According to the present exemplary embodiment, the protective film 140a is formed of the PEDOT but a material for forming the protective film 140a is not limited thereto. That is, the material of the protective film 140a is not limited as long as the material is highly conductive and has high transparency with respect to visible rays. For example, the protective film 140a may be formed of a ferroelectric polymer including various types of PEDOT/PSS, a thiophene-based polymer, polypyrrole, polyaniline, polyvinylidene fluoride (PVDF), or the like, or a conductive polymer including a ferroelectric inorganic material such as PZT that is available for a sol-gel process. Also, the protective film 140a may be formed of a urethane-curable resin or an organic silicate compound.

According to the present exemplary embodiment, the protective film 140a is formed on the entire surface of the second conductive film 140 but the inventive concept is not limited thereto. That is, according to another exemplary embodiment, the protective film 140a may not be formed on the second conductive film 140. Also, the protective film 140a may not be formed on an area of the second conductive film 140 on which the second electrodes 141 are formed.

According to the present exemplary embodiment, the protective film 140a is formed on the second conductive film 140 but the inventive concept is not limited thereto. That is, according to another exemplary embodiment, a protective film may be also formed on the first conductive film 120, and in this case, the protective film may be formed by using the same material and the same forming method as those of the second conductive film 140.

A pair of the second electrodes 141 is disposed at Y-axial side ends of the second conductive film 140.

Here, a disposition direction of the second electrodes 141 is perpendicular to a disposition direction of the first electrodes 121. The second electrodes 141 function to supply a voltage to the second conductive film 140, and are formed to have a predetermined pattern shape by using a paste including a conductive material such as Ag, Au, or the like.

According to the present exemplary embodiment, the second electrodes 141 are formed on a surface of the protective film 140a by using the conductive material including Ag or Au and by performing screen printing but the inventive concept is not limited thereto. That is, according to another exemplary embodiment, a pattern may be directly formed on the graphene that forms the second conductive film 140, so that the second electrodes 141 may be formed. In order to form the pattern, a photolithography method, a wet etching method, a dry etching method, or the like may be used. Also, the second electrodes 141 may be formed by patterning a metal catalyst layer that is used to grow the graphene. Also, the metal catalyst layer used to grow the graphene may be first patterned, and then the graphene is grown, so that the second electrodes 141 may be first formed before the graphene is transferred.

According to the present exemplary embodiment, the first substrate 110 is formed of a glass material and the second substrate 130 is formed of a flexible polymer material but the inventive concept is not limited thereto. That is, according to another exemplary embodiment, similar to the second substrate 130, the first substrate 110 may be formed of a flexible polymer material, and in this case, the touch panel 100 is completely flexible.

According to the present exemplary embodiment, the first conductive film 120 is formed of the ITO-based material and the second conductive film 140 is formed of the graphene material but the inventive concept is not limited thereto. That is, according to another exemplary embodiment, similar to the second conductive film 140, the first conductive film 120 may be formed of the graphene material.

Also, the connector 150 is formed of a flexible circuit board and functions to connect the first conductive line 111 and the second conductive line 112 to a control device 180, wherein the first conductive line 111 is electrically connected to the first electrodes 121 and the second conductive line 112 is electrically connected to the second electrodes 141.

The intermediate member 160 has a rectangular loop shape having an opening 160a formed therein, and is disposed between the first substrate 110 and the second substrate 130, to mutually fix the first substrate 110 and the second substrate 130 with a predetermined gap therebetween.

A double-sided adhesive member having a predetermined thickness is used as the intermediate member 160. Due to an adhesive portion of the double-sided adhesive member, the first substrate 110 and the second substrate 130 are fixed to each other, and due to the predetermined thickness of the double-sided adhesive member, the predetermined gap is formed between the first substrate 110 and the second substrate 130. Also, the intermediate member 160 functions to prevent air from flowing between the inside and the outside of the touch panel 100.

According to the present exemplary embodiment, the double-sided adhesive member is used as the intermediate member 160 but the inventive concept is not limited thereto. That is, according to another exemplary embodiment, the intermediate member 160 may be formed by coating an adhesive material, and then hardening the coated adhesive material.

A plurality of conductive parts 161 are disposed on the intermediate member 160, and function to electrically connect ends 141a of the second electrodes 141, which are disposed on the surface of the second substrate 130, to the second conductive line 112 formed on the upper surface of the first substrate 110.

The spacers 170 are formed at predetermined regular gaps on a surface of the first conductive film 120.

The spacers 170 function to prevent a malfunction of the touch panel 100 by maintaining a gap between the first conductive film 120 and the second conductive film 140 by preventing the second substrate 130 from unintentionally bending due to a weight of the second substrate 130. The spacers 170 are formed of an electrically insulating material.

According to the present exemplary embodiment, the spacers 170 are formed on the first conductive film 120 but the inventive concept is not limited thereto. That is, according to another exemplary embodiment, the spacers 170 may be formed on the second conductive film 140 or may be formed on both of the first conductive film 120 and the second conductive film 140.

Hereinafter, the operation of the touch panel 100 having the aforementioned structure is described with reference to FIG. 4.

Figure 4:
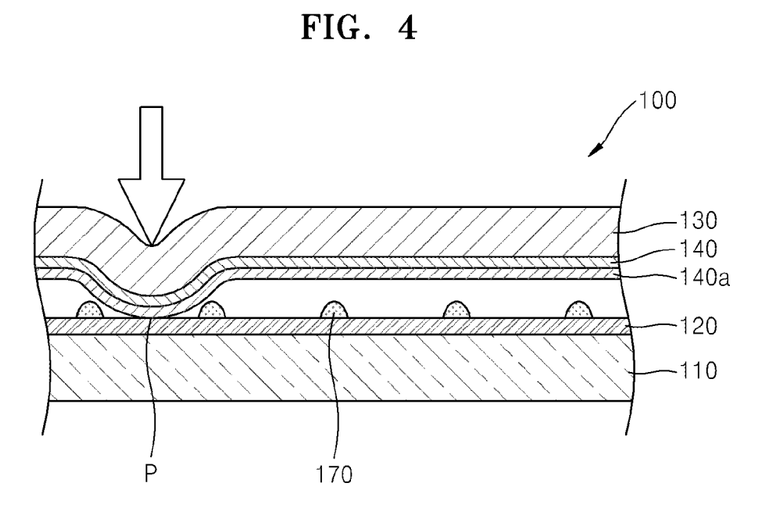
FIG. 4 is a cross-sectional view illustrating a state in which pressure is applied to the touch panel, according to an exemplary embodiment.

FIG. 4 is a cross-sectional view illustrating a state in which pressure is applied to the touch panel 100.

The control device 180 alternately applies a predetermined voltage to the first electrodes 121 and the second electrodes 141 of the touch panel 100. In the state, as illustrated in FIG. 4, when a desired position on an exterior surface of the second substrate 130 is pressed by using a pointing device or a finger, the first conductive film 120 and the second conductive film 140 contact each other at a pressure point P, so that electricity flows therebetween. At this time, the voltage is detected by an electrode to which the voltage is not applied, and then a location on an axis (e.g., an X-axis) corresponding to the pressure point P is calculated. By repeating this procedure, a location on another axis (e.g., a Y-axis) corresponding to the pressure point P is also calculated, so that 2D coordinates corresponding to the pressure point P are detected.

The touch panel 100 described above includes the second conductive film 140 formed of the graphene material, so that the touch panel 100 has graphene characteristics including high shock resistance, excellent flexibility, high transparency, and high electrical conductivity. That is, the touch panel 100 including graphene is highly resistant to external shock, highly flexible, and further transparent, and has fast response speeds and reliability of use, compared to a related-art touch panel formed of only an ITO electrode.

Figure 5:
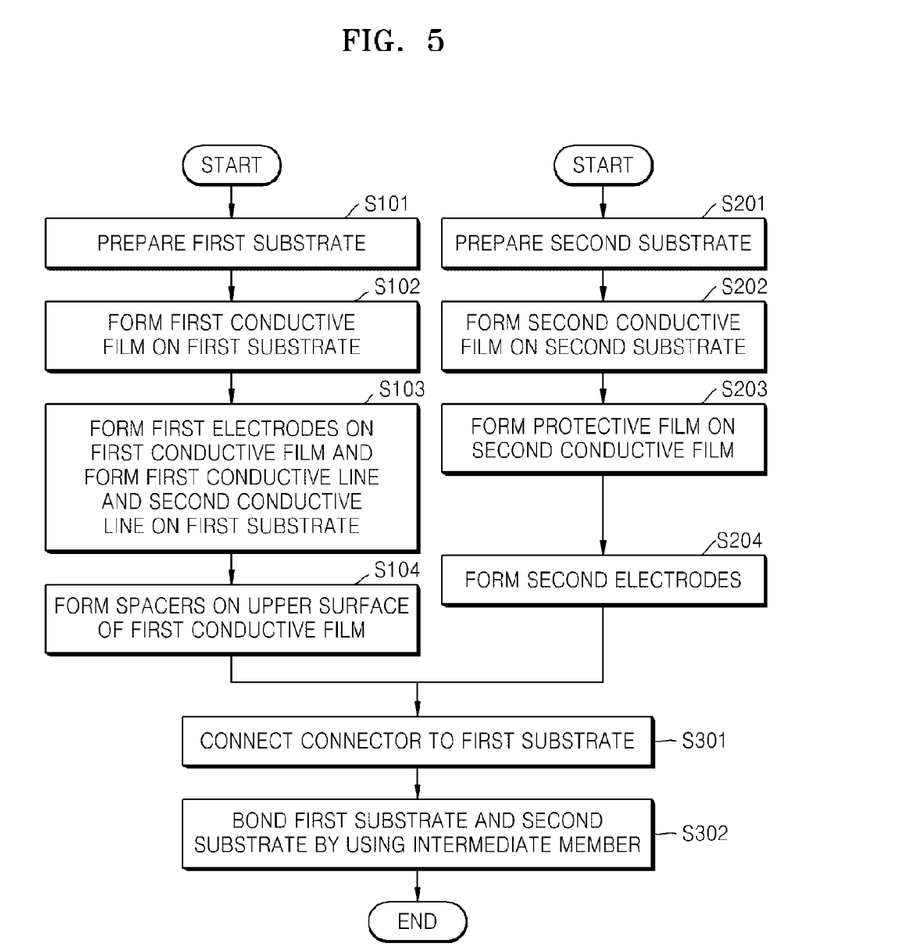
FIG. 5 is a flowchart of a method of manufacturing a touch panel, according to an exemplary embodiment.

Hereinafter, a method of manufacturing the touch panel 100 is described with reference to FIG. 5. FIG. 5 is a flowchart of a method of manufacturing a touch panel, according to an exemplary embodiment.

<Preparation of the First Substrate 110, and a Process of Forming the First Conductive Film 120>

A manufacturer prepares glass of a predetermined size that is an original material for forming the first substrate 110 (operation S101).

Afterward, the first conductive film 120 is formed on the first conductive film 120 (operation S102). The first conductive film 120 is formed of an ITO material by using a thin film forming technique including a vacuum evaporation method or a sputtering method.

Also, the manufacturer forms the first electrodes 121 at side ends of the first conductive film 120 by performing screen printing so that the first electrodes 121 have a predetermined pattern, and then forms the first conductive line 111 and the second conductive line 112 on the first substrate 110 by performing screen printing (operation S103). In this case, the screen printing involves using a paste including Ag, and after the screen printing is performed, a curing process is conducted for about 5 minutes at a temperature between 150° C. through 180° C.

Afterward, the non-conductive spacers 170 are formed at regular gaps on a top surface of the second substrate 130 (operation S104).

The spacers 170 may be formed by using a photolithography method or performing screen printing. If the spacers 170 are formed on the second conductive film 140, the spacers 170 have to be cured by performing a thermal curing process, instead of an ultraviolet curing process, and a material for forming the spacers 170 has to be appropriate for the thermal curing process because the graphene for forming the second conductive film 140 is vulnerable to ultraviolet rays.

<Preparation of the Second Substrate 130, and a Process of Forming the Second Conductive Film 140>

The manufacturer prepares a predetermined-size flexible polymer including PET, polycarbonate, cycloolefin, or the like, which is an original material for forming the second substrate 130 (operation S201).

Afterward, the second conductive film 140 is formed on the second substrate 130 (operation S202).

The second conductive film 140 is formed of graphene, and the manufacturer forms the second conductive film 140 by transferring the graphene to the second substrate 130.

Hereinafter, with reference to FIGS. 6 through 12, a process for forming the second conductive film 140 on the second substrate 130 by using the graphene is described.

One of methods of forming the graphene is to use chemical vapor deposition (CVD). A detailed process for forming the graphene by the CVD is as follows.

Figure 6:
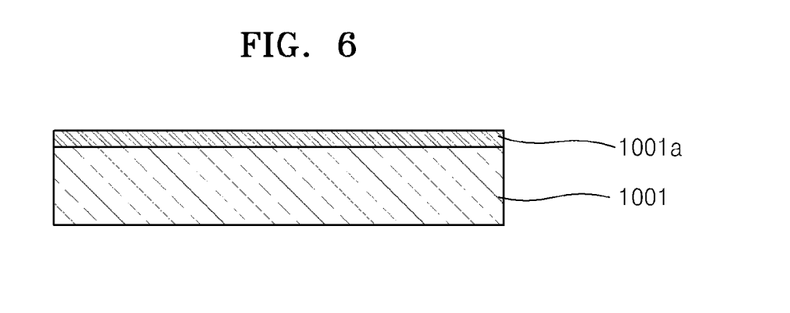
FIGS. 6 through 12 are diagrams illustrating a process of forming a second conductive film on a second substrate, according to exemplary embodiments.

First, as illustrated in FIG. 6, a base member 1001 whereon a catalyst support layer 1001a is formed is prepared. Here, a silicon oxide (SiO2) layer may be used as the catalyst support layer 1001a, and a silicon wafer may be used as the base member 1001.

Figure 7:
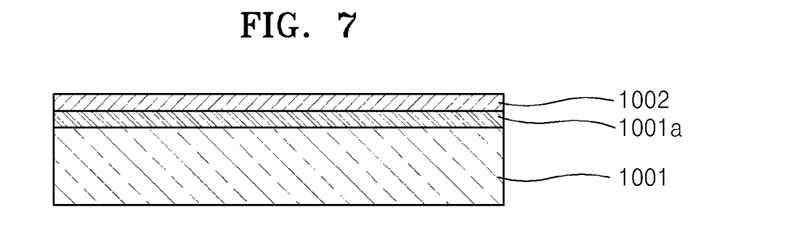

Next, a metal catalyst selected from the group consisting of nickel (Ni), cobalt (Co), iron (Fe), platinum (Pt), gold (Au), aluminium (Al), chromium (Cr), copper (Cu), magnesium (Mg), manganese (Mn), molybdenum (Mo), rhodium (Rh), silicon (Si), tantalum (Ta), titanium (Ti), tungsten (W), uranium (U), vanadium (V), and zirconium (Zr) is deposited on the catalyst support layer 1001a (i.e., a SiO2 layer) by using a sputtering device or an e-beam evaporator, so that, as illustrated in FIG. 7, a metal catalyst layer 1002 is formed. However, the metal catalyst layer 1002 may be formed by using another method, e.g., a metal catalyst layer may be directly provided in the form of a foil. In this case, the silicon wafer including the SiO2 layer may not be used.

Figure 8:
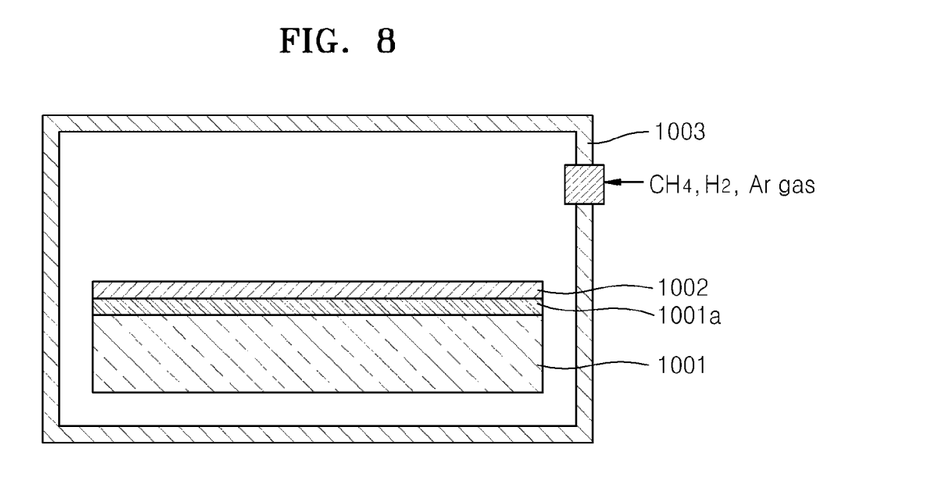

Next, as illustrated in FIG. 8, the base member 1001 whereon the metal catalyst layer 1002 is formed, and a carbon gas (e.g., CH4, C2H2, C2H4, CO, or the like) are put into a reactor 1003 for thermal CVD and Inductively Coupled Plasma Chemical Vapor Deposition (ICP-CVD) or Rapid Thermal Chemical Vapor Deposition, and then are heated at a temperature between 300° C. through 2000° C., so that carbon is absorbed into the metal catalyst layer 1002.

Figure 9:
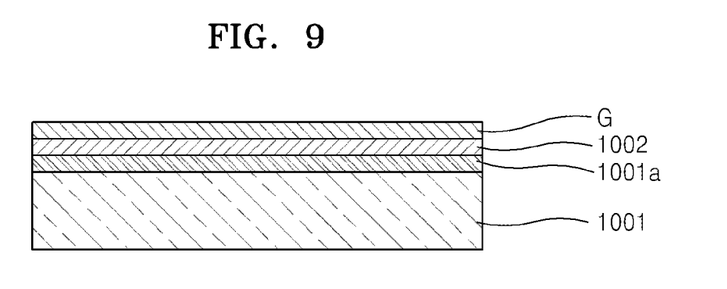

Afterward, as illustrated in FIG. 9, rapid cooling is performed at a cooling speed of about 30° C./min through 600° C./min, so that the carbon is separated from the metal catalyst layer 1002, and then is crystallized so as to grow graphene G.

Figure 10:
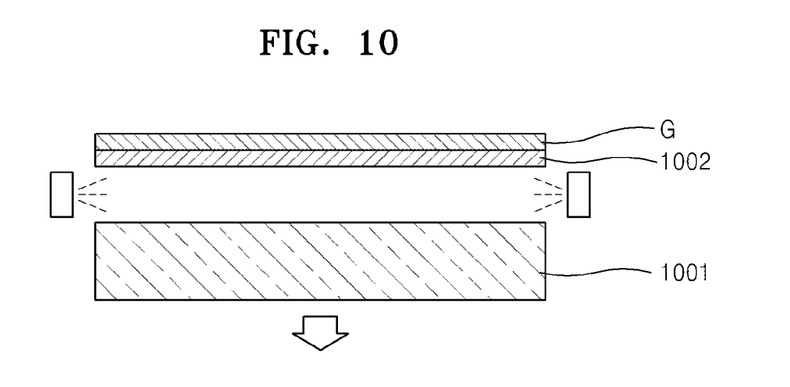

Next, as illustrated in FIG. 10, the metal catalyst layer 1002 is separated from the base member 1001 by removing the catalyst support layer 1001a. For this separation, dry etching is performed by using buffered oxide etchant (BOE) or a hydrogen fluoride (HF) solution so as to remove the catalyst support layer 1001a.

Figure 11:
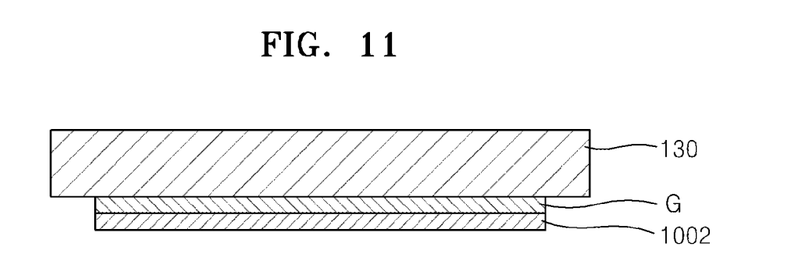

Afterward, as illustrated in FIG. 11, the manufacturer transfers the graphene G to the second substrate 130. Here, the metal catalyst layer 1002 is on the other surface of a surface of the graphene G attached to the second substrate 130. The graphene G may be transferred to the second substrate 130 by using a dry transferring method or a wet transferring method. The dry transferring method includes a direct transferring method for directly transferring the graphene G to the second substrate 130 by using an adhesive, or the like, and an indirect transferring method for using an UV tape, a thermal release tape, or the like.

The wet transferring method may include a transferring method for transferring the graphene G to the second substrate 130 by coating liquefied polymer.

Figure 12:
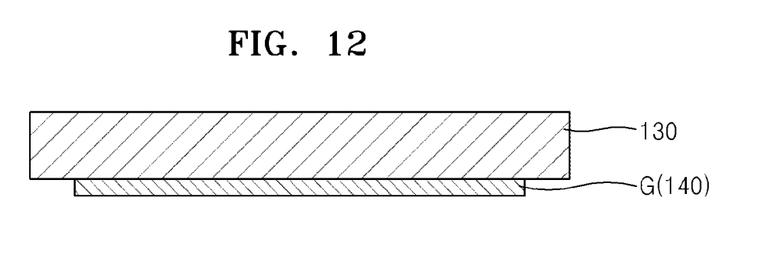

Next, as illustrated in FIG. 12, the manufacturer completely removes the metal catalyst layer 1002 by performing etching, or the like, so that the second conductive film 140 is formed of the graphene G only.

Figure 13:
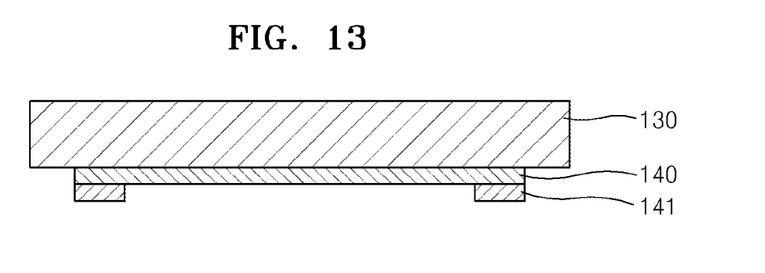
FIG. 13 is a diagram illustrating second electrodes formed on a second conductive film, according to an exemplary embodiment.

According to the present exemplary embodiment, the metal catalyst layer 1002 that contacts the graphene G is completely removed so as to form the second conductive film 140 only of the graphene G but the inventive concept is not limited thereto. That is, according to another exemplary embodiment, the metal catalyst layer 1002 shown in FIG. 11 may be patterned, and then the second electrodes 141 may be directly formed by using remaining portions of the patterned metal catalyst layer 1002. That is, the manufacturer removes the metal catalyst layer 1002 disposed on the surface of the second conductive film 140 formed of the graphene G, except for the remaining portions of the metal catalyst layer 1002 which are to be patterns for the second electrodes 141, so that the second electrodes 141 are formed as illustrated in FIG. 13. Here, the remaining portions which are to be patterns for the second electrodes 141 are generally arranged at side ends of the second conductive film 140, and the metal catalyst layer 100 is patterned by one of various methods including a wet etching method using one or more solutions including FeCl3, acid, BOE, HF, (NH4)2S2O8, Fe(NO3)3, KMnO4, KClO3, KMnO3, K2CrO4, or K2Cr2O7, a dry etching method using a gas plasma, a photolithography method, a laser etching method, or the like.

Afterward, the protective film 140a is disposed on the surface of the second conductive film 140 (operation S203). As described above, PEDOT is used to form the protective film 140a. The manufacturer may form the protective film 140a on the surface of the second conductive film 140 by performing a spin coating method, a spraying method, a gravure printing method, or the like.

Next, the second electrodes 141 are formed on portions of the protective film 140a which correspond to the side ends of the second conductive film 140 (operation S204). In this case, the second electrodes 141 are formed by performing a screen printing method using a paste including Ag, and after the screen printing method is performed, a curing process is conducted for about 5 minutes at a temperature between 150° C. through 180° C.

Figure 14:
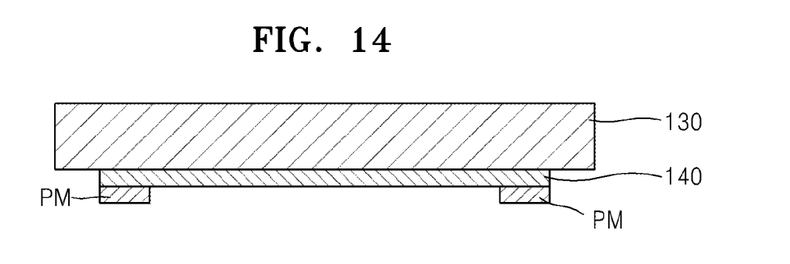
FIGS. 14 and 15 are diagrams illustrating a process of forming a second conductive film and second electrodes, according to other exemplary embodiments.
Figure 15:
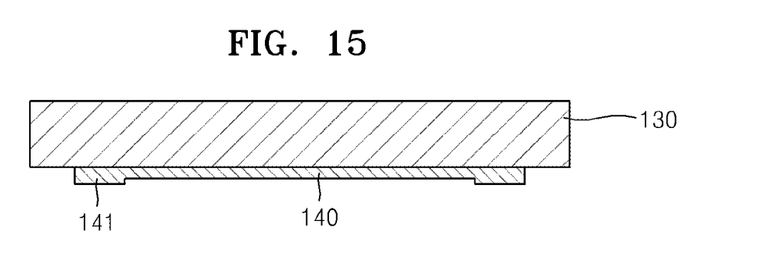

According to the present exemplary embodiment, by performing the screen printing method, the second electrodes 141 are formed on the portions of the protective film 140a which correspond to the side ends of the second conductive film 140 but inventive concept is not limited thereto. That is, according to another exemplary embodiment, in a case of FIG. 12 where the protective film 140a is not formed, the graphene G that is transferred to the second substrate 130 may be selectively removed so that the second conductive film 140 and the second electrodes 141 that are formed of the graphene G may be simultaneously formed. In this case, as illustrated in FIG. 14, a pattern mask PM is formed on the graphene G transferred to the second substrate 130, and portions of the graphene G which are not covered by the pattern mask PM are etched to have a predetermined thickness, so that the second conductive film 140 and the second electrodes 141 are simultaneously formed. Afterward, the pattern mask PM is removed, so that, as illustrated in FIG. 15, the second conductive film 140 and the second electrodes 141 are formed. In this case, a photolithography method, a wet etching method, or a dry etching method may be used, and in this regard, the dry etching method may include a UV irradiating method, an O2 plasma using method, or a laser using method.

Also, according to another exemplary embodiment, in a case of FIG. 12 where the protective film 140a is not formed, graphene may be additionally transferred to the graphene G that is transferred to the second substrate 130, so that the second conductive film 140 and the second electrodes 141 may be formed. Here, the additionally transferred graphene is only disposed on portions corresponding to patterns of the second electrodes 141, and then forms the second electrodes 141.

The aforementioned process of forming the second conductive film 140 on the second substrate 130 may be performed by a roll-to-roll process because the second substrate 130 and the second conductive film 140 are flexible. The roll-to-roll process is advantageous in mass production.

<A Process of Bonding the First Substrate 110 and the Second Substrate 130>

After the first substrate 110, the first conductive line 111, the second conductive line 112, the first conductive film 120, the first electrodes 121, the second substrate 130, the second conductive film 140, the second electrodes 141, and the spacers 170 are formed, the connector 150 is connected to ends of the first conductive line 111 and the second conductive line 112 (operation S301).

Afterward, the first substrate 110 and the second substrate 130 are bonded by using the intermediate member 160 (operation S302). Since the intermediate member 160 is formed of the double-sided adhesive member, the intermediate member 160 may bond the first substrate 110 and the second substrate 130 together. Here, the bonding is performed after a position of the intermediate member 160 is arranged, so that the conductive parts 161 formed on the intermediate member 160 electrically connect the ends 141a of the second electrodes 141, which are formed on the second conductive film 140, to the second conductive line 112 that is formed on the first substrate 110. By doing so, the touch panel 100 is completely manufactured.

According to the present exemplary embodiment, the first substrate 110 and the second substrate 130 are bonded together after the connector 150 is connected to the first substrate 110 but the inventive concept is not limited thereto. That is, according to another exemplary embodiment, the connector 150 may be connected to the first substrate 110 after the first substrate 110 and the second substrate 130 are bonded together, and in this case, it is necessary for the first substrate 110 to have a structure (e.g., an externally projecting structure) in which a portion of the first substrate 110 which is used for connection with the connector 150 may be connected to the connector 150 even after the first substrate 110 and the second substrate 130 are bonded together.

Hereinafter, a structure of a touch panel 200 is described with reference to FIG. 16, focusing on differences with the structure of the touch panel 100.

Figure 16:
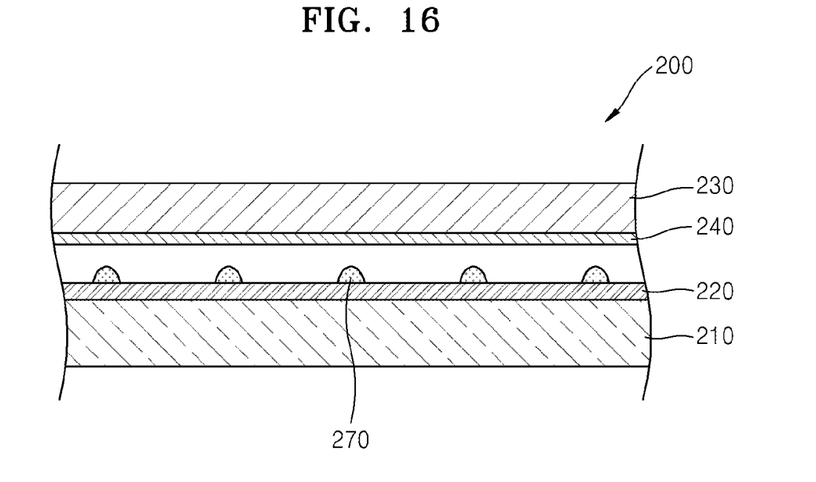
FIG. 16 is a cross-sectional view of a portion of a touch panel according to another exemplary embodiment.

FIG. 16 is a cross-sectional view of a portion of the touch panel 200 according to another exemplary embodiment.

In the touch panel 200 according to the present exemplary embodiment, not only a second substrate 230 but also a first substrate 210 is formed of a flexible polymer material, and not only a second conductive film 240 but also a first conductive film 220 is formed of graphene.

By having the aforementioned configuration, the touch panel 200 is completely flexible. Since the graphene is excellent in flexibility, durability, and control of its electrical characteristic when the graphene bends, the touch panel 200 formed of the graphene may stably operate although the touch panel 200 bends or twists to a certain level.

In this case, a process of forming the first conductive film 220 on the first substrate 210 by using the graphene, and a process of forming the second conductive film 240 on the second substrate 230 by using the graphene may be the same as the process of forming the second conductive film 140 on the second substrate 130 in the previous exemplary embodiment. Also, first and second electrodes for the touch panel 200 may be formed by using the process of forming the second electrodes 141, and a material and a forming method of spacers 270 for the touch panel 200 may be the same as those for the spacers 170, so that detailed descriptions thereof are omitted here.

The configuration, operations, and effects of the touch panel 200 and the method of manufacturing the touch panel 200 are the same as those of the touch panel 100 and the method of manufacturing the touch panel 100 except for the aforementioned differences, thus, detailed descriptions thereof are omitted here.

According to the one or more embodiments, it is possible to provide a touch panel having excellent flexibility and functions.

While the exemplary embodiments have been particularly shown and described with reference to exemplary embodiments thereof, it will be understood by those of ordinary skill in the art that various changes in form and details may be made therein without departing from the spirit and scope of the inventive concept as defined by the following claims.

The invention claimed is:

1. A method of manufacturing a touch panel comprising a first substrate whereon a first conductive film is disposed, and a second substrate whereon a second conductive film facing the first conductive film is disposed, the method comprising:
  preparing the first substrate and the second substrate;
  forming the first conductive film and the second conductive film, wherein at least one of the first conductive film and the second conductive film is formed by transferring graphene;

forming first electrodes electrically connected to the first conductive film and forming second electrodes electrically connected to the second conductive film; and bonding the first substrate and the second substrate, wherein at least one of the first electrodes and the second electrodes are formed of a portion of a metal catalyst layer which remains after patterning the metal catalyst layer that is used to grow the graphene, and wherein the portion of the metal catalyst layer becomes a pattern of the electrodes.

2. The method of claim 1, wherein at least one of the first substrate and the second substrate comprises flexible polymer.

3. The method of claim 1, wherein the transferring of the graphene involves performing a transfer by using a tape.

4. The method of claim 1, wherein the transferring of the graphene involves performing a transfer by coating liquefied polymer.

5. The method of claim 1, further comprising, between the forming and the bonding, disposing a protective film on at least one of the first conductive film and the second conductive film.

6. The method of claim 5, wherein the protective film comprises at least one of poly(3,4-ethylenedioxythiophene) (PEDOT), PEDOT/PSS, a urethane-curable resin, an organic silicate compound, a thiophene-based polymer, polypyrrole, polyaniline, a ferroelectric polymer, and a ferroelectric inorganic material.

7. The method of claim 1, further comprising, between the forming and the bonding, disposing a plurality of spacers on at least one of the first conductive film and the second conductive film.

8. The method of claim 1, wherein the bonding is performed by using an intermediate member.

* * * * *